United States Patent [19]

Hjersted

[11] Patent Number: 4,707,349
[45] Date of Patent: Nov. 17, 1987

[54] PROCESS OF PREPARING A PREFERRED FERRIC SULFATE SOLUTION, AND PRODUCT

[76] Inventor: Norman B. Hjersted, 5201 Johnson Dr., Mission, Kans. 66205

[21] Appl. No.: 834,898

[22] Filed: Feb. 28, 1986

[51] Int. Cl.$^4$ ............................................. C01G 41/14
[52] U.S. Cl. ..................................... 423/558; 423/146; 423/DIG. 2
[58] Field of Search ................. 423/558, DIG. 2, 633, 423/146; 210/759, 760, 716, 722

[56] References Cited

U.S. PATENT DOCUMENTS

| | | | |
|---|---|---|---|
| 1,047,826 | 12/1912 | McKechnie | 423/DIG. 2 |
| 1,316,909 | 9/1919 | MacKaye | 423/558 |
| 1,430,551 | 10/1922 | Herrly | 423/558 |
| 1,880,265 | 10/1932 | Marsh et al. | 423/558 |
| 1,917,945 | 7/1933 | Marsh et al. | 423/558 |
| 2,149,327 | 3/1939 | Wilson et al. | 423/558 |
| 2,296,423 | 9/1942 | Clark | 423/DIG. 2 |
| 2,905,533 | 9/1959 | Webb | 423/558 |
| 3,256,183 | 8/1944 | Shepard et al. | 423/DIG. 2 |
| 3,347,787 | 10/1967 | Rhodes et al. | 423/DIG. 2 |
| 3,539,337 | 11/1970 | Stanimirovitch et al. | 423/DIG. 2 |
| 3,716,566 | 2/1973 | Sansoni et al. | 210/759 |
| 3,787,306 | 1/1974 | Senior et al. | 423/DIG. 2 |
| 3,816,593 | 6/1974 | Johnson | 423/DIG. 2 |
| 3,954,953 | 5/1976 | Satterwhite et al. | 423/558 |
| 4,443,342 | 4/1984 | Stas et al. | 210/759 |
| 4,507,273 | 3/1985 | Hudson | 423/558 |

FOREIGN PATENT DOCUMENTS

| | | | |
|---|---|---|---|
| 464517 | 8/1975 | Australia | 423/558 |
| 54-49999 | 4/1974 | Japan | 423/558 |
| 1143139 | 2/1969 | United Kingdom | 423/558 |

OTHER PUBLICATIONS

Lewis, C. J., Some Practical Suggestions on Waste Acid Treatment, Rock Products Jun. 1945, pp. 117–119, 149–150.

Primary Examiner—Gary P. Straub
Attorney, Agent, or Firm—Litman, McMahon & Brown

[57] ABSTRACT

A process is provided for preparing a preferred ferric sulfate solution. The product of the process is particularly suited for use in water treatment and purification. According to the process, iron oxides or iron, are dissolved in sulfuric acid to form ferrous sulfate. In a first step of oxidation, the ferrous sulfate is partially oxidized to ferric sulfate in the presence of dissolved oxygen. In a second stage of oxidation, remaining ferrous sulfate is oxidized to ferric sulfate by the action of a non-molecular oxygen oxidizing agent such as hydrogen peroxide. During both stages of oxidation, a catalyst such as copper sulfate or copper ammonium sulfate may be used. Careful control of added sulfuric acid is maintained, to avoid excess or free sulfuric acid in the reaction product. The final reaction product is generally characterized by having: between about 10% and 12% iron by weight; substantially all iron present in the ferric form; and, by having less than 0.5% free or excess acid, by weight.

15 Claims, No Drawings

PROCESS OF PREPARING A PREFERRED FERRIC SULFATE SOLUTION, AND PRODUCT

BACKGROUND OF THE INVENTION

The present invention relates to the production of iron (III) sulfate and in particular to the production of preferred iron (III) sulfate solutions for use in water treatment and water purification facilities. In this specification, iron (III) sulfate refers to an iron salt with the iron in the ferric form, and iron (II) sulfate refers to an iron salt with the iron in the ferrous form or ferrous oxidation state.

It is well known that various hydroxides may be used as coagulating or floc producing agents in water purification and treatment facilities. The floc formed from such agents may be used to trap undissolved materials in the water such as organics, inorganic precipitates, and various biological matters. The floc precipitate generally effectively attracts and absorbs even very fine contaminating particles. During the treatment process, the floc grows in size, and ultimately is removed from the water by settling, skimming or filtering. Such agents may also be used in the treatment of water for the presence of phosphates, and as sludge conditioners in sewage treatment, whereby the sludge is rendered more capable of being filtered and treated.

The better known flocculating agents or floc producing agents are probably ferric hydroxide and aluminum hydroxide. In the past, aluminum hydroxide has often been preferred. However, recently the presence of aluminum hydroxides in treated water has caused some concern as a potential health and/or environmental risk. Thus, more recently, attention has been focusing on the use of ferric hydroxides as water purifying agents.

A well known process for the production of ferric hydroxide, in water treatment facilities, has been by the addition of ferric sulfate to the water to be treated. Generally, the alkaline content of the water rapidly induces hydroxide formation and ultimate floc production, after ferric sulfate is added to the water. If necessary, the pH, or hydrogen ion content of the water, may be adjusted for preferred hydroxide formation.

In the past, numerous problems have resulted from the utilization of ferric sulfate as the hydroxide producing agent. Generally, these can be traced to problems arising during the initial ferric sulfate production, and in the composition of the ferric sulfate agent used, rather than any inherent problem in the use of ferric sulfate itself. For example, ferric sulfate is generally produced from the oxidation of ferrous sulfate. If the oxidation does not go to completion, then some ferrous sulfate may still be present in the water treatment compound. While ferric sulfate is highly soluble in water, and rapidly forms relatively insoluble ferric hydroxide, ferrous sulfate forms ferrous hydroxide, which is somewhat soluble. Thus, in the past, the water being treated may have introduced therein, during the hydroxide forming step, the presence of soluble ferrous hydroxide that is not separated out by the floc. The ferrous hydroxide would then contaminate the treated water.

Further, ferrous sulfate is less soluble in water than is ferric sulfate. The presence of ferrous sulfate in the solutions to be used at water treatment facilities can cause problems, for example by precipitation from solution in the equipment of the plant.

Another problem with ferric sulfate compounds made according to prior processes has been the presence of excess acidity, generally free sulfuric acid, in the ferric sulfate product. Generally, when ferrous sulfate is oxidized, the resulting products are ferric oxide and ferric sulfate. However, if the oxidation takes place in the presence of sulfuric acid, the resulting product is primarily ferric sulfate, with relatively little of the oxide present. Generally, in past productions of ferric sulfate, according to such a general reaction scheme, excess acid would be present in the resulting ferric sulfate product. When such a product has been used in a water treatment facility, it has often been necessary to add alkaline compounds to the water, to adjust the pH of the solution. This not only can be costly, but also the temporary excess acidity, and the length of time taken for neutralization, may inhibit good floc formation. That is, generally, good floc formation has been found to be related to a relatively short period of time for hydroxide formation. If the length of time is increased, floc formation, in water purification, may not be as efficient. Further, the temporary excess acidity may be harmful to the pipes or machinery in the treatment plant. Also, the addition of alkaline materials to adjust pH may be undesirable under some circumstances.

Conventional methods of forming ferric sulfate generally result in a product which is a slurry, sludge or solid. Such products have, in the past, posed several problems. First, the material may be relatively difficult to handle or dissolve, especially if in the form of a rather solid cake. Further, impurities from the initial iron source may be present in the solid product, resulting in the addition of impurities to the water. Further, such a product may be relatively difficult to handle and package at the site of formation, especially since solid ferric sulfate may be relatively hygroscopic.

OBJECTS OF THE INVENTION

Therefore, the objects of the present invention are: to provide an iron (III) sulfate product especially suited as a water treatment product for use in generating floc formation and coagulation during water treatment; to provide such a product which is characterized by a selected and minimal free acid content; to provide such a product which includes less than 0.5% by weight free acid; to provide such a product in which the iron content is substantially 99.9% by weight ferric ion, present as ferric sulfate; to provide such a product which has less than 0.1 of 1% by weight insolubles present therein; to provide such a product which generally comprises an aqueous solution of ferric sulfate in which the total iron content, by weight, is preferably greater than about 10%; to provide a process of producing such a product; to provide such a process wherein the iron starting material may be scrap metal iron or iron oxides; to provide such a process wherein during an initial step the iron oxides or scrap metal iron are dissolved in sulfuric acid, to form iron sulfates; to provide such a process in which during dissolving of the scrap metal and/or iron oxides, the amount of sulfuric acid used is maintained within desired limits for yielding a final product without excess acidity; to provide such a process in which oxidation of ferrous sulfate in the reaction mixture, to ferric sulfate, is conducted in two oxidation steps, the first step being oxidation in the presence of molecular oxygen and, the second step being final oxidation in the presence of a chemical oxidizing agent selected from a group of non-$O_2$ oxidizing agents; to provide such a process in which the chemical oxidizing agent is hydrogen peroxide; to provide such a process in which the desired iron compounds in the reaction mixture are substantially in solution throughout the process, so that by decantation or filtration undesired insolubles, from the starting materials or otherwise, may be removed; to provide such a process in which a catalyst may be used during oxidation; to provide such a process in which the catalyst is selected from a group of copper catalysts including copper sulfate and copper ammonium sulfate; to provide such a process in which the resulting product from the final oxidation step includes a concentration of iron, by weight, of greater than about 10% so that the product, without further treatment or concentration, contains an appropriate iron (III) sulfate concentration for use as a water treating agent; to provide such a process which produces a product that is stable with respect to precipitation over a relatively wide temperature range, including normal shipping or use temperature ranges; to provide such a process which is relatively inexpensive to effect; to provide such a process which is relatively easy to effect; to provide such a process which may take advantage of relatively readily available starting materials; and to provide such a process which is particularly well adapted for the preparation of iron (III) sulfate products for water treatment and similar uses.

Other objects and advantages of this invention will become apparent from the following descriptions wherein are set forth by illustration and example certain embodiments of this invention.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific details disclosed herein are not to be interpreted as limiting, but rather merely as a basis for the claims and as a representative basis for teaching one skilled in the art to variously employ the present invention in virtually any appropriate manner.

As used herein, all temperatures are in °Fahrenheit (F.); all percentages (%) or parts per million (ppm) are by weight; and all pressures (PSI) are gauge, unless otherwise noted. In addition, the term equivalents (or equivalent) is understood to mean mole equivalents. Also, unless otherwise noted, the terms "oxygen" or "dissolved oxygen", when used in conjunction with solutions herein, are understood to mean molecular oxygen dissolved in such a solution, which oxygen may be derived by adding or bubbling air, purified oxygen (such as from a liquid oxygen source) or any other suitable source of oxygen into the solution.

The process of the present invention concerns the production of preferred iron (III) sulfate solutions; i.e. aqueous solutions of ferric sulfate. The preferred solutions have little, if any, free acid content, i.e. less than 0.5% by weight; have relatively little ferrous ion present; and include a minimal insolubles content. The reaction product is also characterized by being an aqueous solution of ferric sulfate, with an iron content of at least 10% and preferably at least 12%, by weight. The process is, in part, characterized by being relatively easy to effect and by permitting the use of readily available starting materials.

Generally, a variety of sources of iron may be used according to the present invention. It is foreseen that preferred sources of iron would be scrap metal iron, which primarily includes iron in an unoxidized state, or various iron oxide compositions, such as ore, which usually include mixtures of iron (II) oxides and iron (III) oxides.

Initially, the process will be described using scrap metal iron as the starting material. For the most part, the process is the same for the use of iron oxides, however preferred modifications will be discussed below.

Scrap metal iron, which is available from many commercial sources in a variety of purities and compositions, generally includes iron in an unoxidized state, and sometimes includes contaminating silicates and carbon compounds. According to the process of the present invention, the scrap metal iron is first dissolved in sulfuric acid. Preferably, the total amount of iron present in the metal used will have been initially assayed, and a sufficient amount of sulfuric acid will be added to completely dissolve the metal, and yield approximately one mole equivalent of sulfuric acid, per mole equivalent of iron. The resulting solution is substantially an aqueous solution of iron (II) sulfate, i.e. ferrous sulfate. In the preferred embodiment, zero to a slight excess (that is, more than is necessary to dissolve the components) of sulfuric acid, 0% to about 10% by weight, may be used at this dissolving stage.

Preferably, the dissolving of the scrap iron, in the aqueous sulfuric acid solution, is done within a temperature range of 160° Fahrenheit (F.) to about 230° F., and most preferably at approximately 200° F. It has been found that under such conditions, when carefully controlled, and when only sufficient acid solution is added to make the iron completely soluble, the resulting iron solution includes a total iron concentration, by weight, of at least 10%. Generally, the acid solution is heated prior to dissolving, and the mixing may be either by addition of the acid to the metal, the metal to the acid, or simultaneous addition to the reaction vessel. While the acid dissolving might be done outside of the preferred temperature range, the probability of problems from precipitates would be expected to be increased.

It will be readily understood that the length of time required to dissolve the iron will vary, in part depending upon the particle size of the iron scraps used. Generally, for scrap metal available for most scrap iron sources, a total dissolving time of from a few hours to about twelve hours may be necessary.

At the end of the dissolving process, the resulting solution contains, generally: ferrous sulfate; a relatively low percentage of excess sulfuric acid (preferably 0 to 0.5% by weight); and water. Also, insoluble impurities, such as silicates, from the scrap metal iron may be suspended in the solution.

The next step in the process is the partial oxidation of the ferrous sulfate to ferric sulfate. When conducted in the presence of sulfuric acid, the oxidation of ferrous sulfate generally yields ferric sulfate. According to the present process, the reaction solution is placed in a vessel, preferably under pressure, in the presence of a dissolved oxygen source such as compressed air or liquid oxygen. An aqueous sulfuric acid solution is slowly added to the reaction vessel, during the oxidation. Care is taken to avoid the addition of excess sulfuric acid, which might lead to precipitates or a final product having excess or free acidity. Rather, the final molar ratio of added sulfuric acid is pre-calculated so that the final, total, concentration of added sulfuric acid or sulfate ion in the mixture, relative to iron ion, is approximately 1.5 to 1. That is, if complete oxidation were achieved, the solution would contain ferric sulfate with substantially no excess or free sulfuric acid present.

The addition of the sulfuric acid is done relatively slowly (for example, addition may be evenly divided over the entire period of first stage oxidation), in part, in order to avoid the precipitation of ferrous sulfate from the solution and to control the reaction rate. The pressure at which the reaction vessel is maintained and the temperature of the reaction are primarily economic considerations; that is, the operator may choose a combination of the pressure and temperature which yields a preferred rate of conversion. The reaction vessel is preferably maintained under a pressure of approximately 100 pounds per square inch and the reaction is run at a temperature of between about 180° F. and 220° F. It has been found that temperature ranges outside of the preferred range may result in the precipitation of products such as iron oxide or the precipitation of some starting material ferrous sulfate, from the solution.

Generally, the precise conditions are determined by the operator, ad hoc, who controls the reaction to minimize precipitation and maximize rate. Throughout the reaction, the disappearance of ferrous sulfate may be monitored, with sufficient sulfuric acid being added to maintain the reaction at a desired rate. Again, a primary concern is to avoid the addition of excess acid beyond a 1.5 to 1 ratio of total sulfuric acid, or sulfate ion, to iron.

In a typical production run, about 5,000 gallons of reaction solution, weighing about 12.5 pounds per gallon as a result of dissolved iron and sulfuric acid, may be used. The reaction vessel would be pressurized to about 100 pounds per square inch, under oxygen introduced from a liquid oxygen source. The oxidation/acidification step, under such circumstances, would take about 8–12 hours, when a copper catalyst, such as copper sulfate or copper ammonium sulfate, is used. It will be understood that while a catalyst may be used, it is not necessarily required for oxidation. The length of time will vary, of course, depending primarily upon the rate of addition of the acid and the extent of agitation. Again, the rate is generally limited by adding the acid at such a rate that the excess acidity does not lead to precipitation of insolubles. That is, as long as no precipitate is noted, generally acid is added until the limit is reached.

Following the above described initial oxidation step, the reaction solution includes both ferrous sulfate and ferric sulfate. That is, under general reaction conditions it is found that only about 95% oxidation takes place. It has been found, experimentally, that it is quite difficult to achieve a final, complete, oxidation using air or liquid oxygen. Preferably, the first oxidation is run until about 95% oxidation (i.e., ferrous to ferric) is achieved, with any longer reaction time, in an attempt to achieve greater oxidation, being generally ineffective and uneconomical.

In order to complete the oxidation, the process of the present invention includes a second step of oxidation wherein a non-molecular oxygen oxidizing agent, such as a peroxide, is added to the reaction mixture. The agent hydrogen peroxide has been found to be preferable. Generally, the oxidation is conducted without outside heating of the reaction mixture, preferably with the temperature having fallen to about 130° F., and under atmospheric pressure. However, a wide range of temperatures would be expected to yield good conversion.

The above described conditions yield substantially complete oxidation in about three hours. It will be understood that the hydrogen peroxide solution used, which is preferably an aqueous solution including between about 30% and 40% hydrogen peroxide, is preferably added relatively slowly and cautiously to minimize the potential danger from explosive oxidation. A variety of techniques for handling large amounts of hydrogen peroxide are well known and documented.

Generally, for reasons of safety, efficiency and convenience, excess hydrogen peroxide is avoided. Also, excess hydrogen peroxide may lead to problems with precipitates. Throughout the process, the amount of ferrous sulfate present may be assayed, with the hydrogen peroxide addition continuing until essentially no ferrous sulfate is left in the solution, i.e. until oxidation is complete.

At this point, the reaction solution typically consists essentially of ferric sulfate in water. Any solid precipitates can be filtered out, by filtering through an industrial filter such as a cheese cloth or the like. It will be understood that filtration may have been done at almost any convenient point following the initial dissolving of the metal.

Preferably, dilutions have been selected such that by the end of the final conversion, the total concentration of iron ion present is at least about 10% by weight, in the product solution. In this manner, a preferred product for use in water treatment facilities is taken directly from the second oxidation step reaction vessel, without further concentration. That is, it has been found that the process, when conducted in the concentration ranges preferred to achieve such a final product concentration, not only proceeds efficiently but also produces a preferred final product that does not require final dilution and/or concentration. Again, it is noted that a ferric sulfate solution having a concentration in the preferred range is relatively stable to any substantial precipitation over a wide temperature range, including the temperature range over which most products would be shipped, stored or used in a treatment facility.

If a mixture of iron oxides is used, such as an ore, basically the same procedure may be followed. However, at the initial dissolving stage generally all of the sulfuric acid needed to reach a 1.5 to 1 ratio with the iron may be added. That is, generally, acid is not added during the oxidation. It is observed that generally, with oxides, there is less problem with precipitation from the reaction mixture.

Except as outlined above, the two stage oxidation process would follow an analagous course to that described for scrap iron, with careful control of total added acid to avoid excess acidity in a final reaction product mixture, and to avoid precipitation. Again, the principal parameters to be controlled are temperature and pressure, for control of reaction rate and maintenance of solubility of starting materials and products.

As alluded to above, it is foreseen that a variety of chemical oxidizing agents may be used during the second step of the oxidation reaction. Hydrogen peroxide is foreseen to be the preferred oxidizing agent, since it is does not result in any undesired contamination of the product. However, it is foreseen that such agents as: ozone; peroxides other than hydrogen peroxide; ammonium persulfate; chlorine dioxide; and chlorine, may also be usable.

Generally, mining sources can provide adequate iron oxides, for use in the modification of the process which begins with iron oxides rather than scrap metal iron. In some instances, ores of mixed iron oxides as mined may be of such high quality that substantial purification is not necessary prior to the initial dissolving in the sulfuric acid solution.

As suggested above, with respect to both the starting materials and product mixtures, it is often necessary to assay the amount of iron present as the ferrous iron or the ferric iron. Generally, conventional methods of assay may be used, for example wherein the amount of ferrous ion present is determined by titration with potassium dichromate. Following such a potassium dichromate oxidation, all iron ion present would generally be in the form of the ferric ion. The total ferric ion content would then be determined with conventional techniques such as by reduction with stannous chloride or similar compounds. Thus, the amount of ferric ion present in the initial ferric/ferrous mixture can be determined by calculation.

The product prepared by the above process preferably includes less than 0.5% by weight free acid. It also preferably has at least 99.9% by weight of the iron present in the ferric form. Further, it has been found that relatively little, less than 0.1 of 1% by weight, insolubles are present, the amount of insolubles being controlled, in part, by filtering. The product solution generally has a reddish-brown color, but is otherwise clear. That is, it includes relatively little particulate matter in suspension.

As indicated above, during the oxidation step a catalyst may be used. Although the art teaches the utilization of nitrogen oxides as a catalyst, their use in preparing compounds for water treatment may be undesirable, due to their potential toxicity. Preferred catalysts for use with the present process are copper salts, preferably copper sulfate or copper ammonium sulfate, present in a concentration of about 200 parts per million by weight during the oxidation. Generally, such catalysts, being present in the final product in such a low concentration ratio, are believed not to pose a significant contamination problem.

Examples of the process in accordance with the invention which follow are for the purpose of demonstrating specific processes in accordance with the invention and are not intended to be limiting in scope on the invention or claims. The following examples are exemplary syntheses of numerous actual runs.

EXAMPLE 1

It is foreseen that a process, according to the present invention, for conversion of scrap metal iron to a preferred iron (III) sulfate solution may be conducted as follows:

A 4,500 gallon solution of ferrous sulfate weighing about 12½ pounds per gallon is prepared. Generally, the solution is prepared from dissolved scrap metal iron, having between about 1 and 1.1 equivalents of sulfuric acid per equivalent of iron. Generally, the solution will have been made by a slow addition of the hot sulfuric acid solution, at about 200° F., until the iron is completely dissolved to form ferrous sulfate in solution.

The reaction solution is then placed in a 5,000 gallon reaction vessel, that can be pressurized and which is formed from a substance non-reactive to the acidic reaction solution. Liquid oxygen is pumped into the reaction vessel, and the pressure of the vessel is brought up to approximately 100 pounds per square inch. Copper ammonium sulfate catalyst, present in solution in a concentration of about 200 parts per million, by weight, is utilized to increase the rate of oxidation.

The first stage oxidation is preferably conducted in a temperature range of between about 180° F. and 200° F. Generally, sulfuric acid is slowly added to the reaction vessel, as the oxidation proceeds. The reaction solution is vigorously agitated, so as to increase the rate of oxidation. Care is taken to avoid the addition of excess sulfuric acid; that is, the addition of sulfuric acid beyond 1.5 equivalents of sulfuric acid or sulfate ion per iron ion present is avoided. The purpose of this is to ensure that at complete oxidation, i.e. complete formation of iron (III) sulfate, none, or very little excess sulfuric acid is present.

Generally, the first step or stage of oxidation is conducted until the rate of oxidation has slowed to a point as to appear to stop, determined by analysis at various time intervals. Generally, this has been found to be when about 95% of the iron in solution has been oxidized to the ferric ion, with about 5% remaining as ferrous ion. At this point, oxidation is sufficiently slow, or stopped, so that 100% oxidation cannot be readily achieved. Generally, the first stage of oxidation takes about 12-20 hours under these conditions.

The solution is then prepared for the second stage of oxidation, by depressurizing to atmospheric pressure, such that the contents of the vessel are under air. Without addition of an external heating source, a hydrogen peroxide solution is carefully added to complete oxidation of the ferrous iron to ferric ion, i.e. oxidation of ferrous sulfate to ferric sulfate. Preferably, an aqueous solution of hydrogen peroxide including about 30% to about 40% hydrogen peroxide, by weight, is used. Also, preferably, excess hydrogen peroxide is avoided. Generally, caution must be used to ensure that the oxidation proceeds at a generally safe, and slow, rate. Techniques for handling hydrogen peroxide under similar conditions are known in the art. Generally, the temperature to which the solution cools during processing will be acceptable, if the rate of oxidation is acceptable, however a good temperature for the peroxide oxidation has been found to be about 130° F., which results in substantially complete oxidation in about three hours.

Following the second step of oxidation, the reaction solution is cooled and, if precipitates or materials in suspension appear, the product solution may be filtered as by passing through a conventional industrial filter press or the like. Without further treatment and/or concentration, the product solution is generally in condition to be contained and shipped for use in a water treatment facility.

Preferably, solution concentrations are selected so that the final iron concentration of the product solution is at least about 10% (preferably 12% or greater) by weight. Such a solution is relatively concentrated for an iron sulfate solution, and is, in part, believed possible due to the absence of any substantial amount of ferrous ion. That is, the product solution is, in part, characterized by having generally at least about 99.9% by weight of the iron present in the solution in the ferric state.

Also, as indicated above, care is taken to maintain that excess acid is not added to the solution. That is, reactant concentrations and amounts are selected such that a total of 1.5 equivalents of sulfuric acid, or sulfate ion, are present per equivalent of iron. In this manner, the product solution is characterized by having less than about 0.5% by weight free acid present.

It is noted that during the first stage of oxidation of ferrous sulfate to ferric sulfate, at least early in the oxidation, a slight excess of sulfuric acid may be present. That is, when the iron is present as ferrous sulfate, the ratio of equivalents of sulfuric acid to ferrous ion may preferably be in the range of about 1/1 to about 1.1/1. It is further noted, however, that as the total amount of sulfuric acid added increases, and the oxidation proceeds near completion, excess acid is avoided so that the final solution never includes substantially more than about 1.5 equivalents of added sulfuric acid or sulfate ion per equivalent of iron, as indicated above.

EXAMPLE 2

It is foreseen that a mixture of iron (II) oxides and iron (III) oxides may be converted to the preferred iron (III) sulfate solution, according to the present invention, as follows:

11,800 pounds of iron ore of approximately 62% by weight iron and comprising minor impurities and iron oxides in a ratio of ferric oxide to ferrous oxide of about 2 to 1 are mixed with about 22,000 pounds of water. 20,400 pounds of 66 Baume sulfuric acid are slowly added to dissolve the oxides and form sulfates. Generally, this solutation takes about three hours, at about 180° F. to 220° F., with agitation. The reaction mixture including the dissolved sulfates is filtered through an industrial filter press to remove any impurities such as silicates or other compounds from the initial ore.

The reaction solution is placed in a pressure vessel, pressurized with liquid oxygen to about 100 pounds per square inch, with a temperature maintained at about 170° F. to 200° F. With agitation, the oxidation proceeds, however the rate of oxidation may be increased with the addition of 200 parts per million by weight of copper ammonium sulfate or copper sulfate, as a catalyst. The reaction is monitored until approximately 95% of the ferrous ion has been converted to ferric ion. A typical first stage oxidation for the above reported reaction mixture will take about 8 to 12 hours.

Following the first stage of oxidation, the reaction vessel is preferably isolated from any outside heating source, with the reaction mixture slowly cooling. An aqueous solution of about 35% hydrogen peroxide is slowly added, to complete oxidation to ferric sulfate. Generally, the reaction is monitored and only sufficient hydrogen peroxide is added to achieve substantially complete oxidation.

Generally, the oxidation is permitted to proceed at the temperature to which the reaction mixture has cooled prior to hydrogen peroxide addition. It has been found that at about 130° F., the oxidation with hydrogen peroxide will run fairly smoothly and be complete in about three hours. However, it will be understood that during the peroxide oxidation, careful control of temperature is generally not necessary, as long as the oxidation can be conducted relatively safely. Generally, during the peroxide oxidation, the reaction mixture is not maintained under pressure above atmospheric, and the mixture is maintained under air.

It is to be understood that while certain forms of the present invention have been illustrated and described herein, it is not to be limited to the specific forms or arrangement of parts described and shown.

What is claimed and desired to be secured by Letters Patent is as follows:

1. A process for the preparation of a ferric sulfate solution; said process including the steps of:
    (a) dissolving metallic iron in an aqueous sulfuric acid solution containing between about 1.0 and 1.1 molar equivalents of sulfuric acid per molar equivalent of iron to be dissolved, to form an initial reaction solution so as to produce ferrous sulfate;
    (b) conducting a first stage of oxidation by reacting the initial reaction solution with oxygen added to and dissolved in the reaction solution, while adding sufficient sulfuric acid to balance the requirement for sulfate in converting ferrous sulfate in the reaction solution to ferric sulfate and while maintaining the addition of sulfuric acid at a sufficiently slow rate relative to the rate of reaction between the sulfuric acid and iron to prevent the precipitation of iron sulfate in the final product and continuing until less than about 10% of the iron originally dissolved remains in a ferrous oxidation state and at least 90% of the iron is a ferric product, the ferric product being substantially ferric sulfate in solution;
    (c) subsequent to the first stage of oxidation, conducting a second stage of oxidation by addition of hydrogen peroxide to the product solution of paragraph b, in the presence of sulfuric acid so as to further convert ferrous sulfate to ferric sulfate; the total amount of sulfuric acid added in paragraphs a, b and c being such that the molar equivalents of sulfate reactions with iron is less than about 1.5 molar equivalents per molar equivalent of iron;
    (d) said step of conducting a second stage of oxidation including conducting said second stage of oxidation until at least 99% of the iron dissolved to form the initial solution has been converted to the ferric oxidation state and a final product having a free sulfuric acid content of less than 0.5% by weight.
2. A process according to claim 1 including the steps of:
    (a) conducting the first stage of oxidation at a temperature of between 180° F. and about 200° F., while conducting said first stage of oxidation in a pressure vessel and maintaining a pressure of the reaction solution, in the pressure vessel and during the first stage of oxidation, of at least about 100 pounds per square inch; and,
    (b) conducting said second stage of oxidation at about atmospheric pressure and about 130° F.
3. A process according to claim 2 including the steps of:
    (a) providing an initial concentration of dissolved iron, as either ferric or ferrous ion, or combinations thereof, of at least about 10% by weight in said initial reaction solution; and,
    (b) maintaining a concentration of dissolved iron, as either ferric or ferrous ion, during both of said first stage of oxidation and said second stage of oxidation, of at least about 10% by weight.
4. A process according to claim 1 including the step of:
    (a) providing a catalyst comprising a copper salt in the aqueous sulfuric acid solution of dissolved iron.
5. A process according to claim 4 wherein:
    (a) said catalyst is selected from the group comprising copper sulfate and copper ammonium sulfate.
6. A process according to claim 5 wherein:
    (a) said catalyst is provided in a concentration of about 200 parts per million by weight.

7. A process for the preparation of a ferric sulfate solution, from a mixture containing ferrous oxide and ferric oxide; said process including the steps of:
 (a) dissolving the mixture of ferrous oxide and ferric oxide in an aqueous sulfuric acid solution to form an initial reaction solution; sulfuric acid being added to said solution as necessary to convert from ferrous sulfate to ferric sulfate and slowly enough to allow reaction between the iron and acid and to prevent substantial precipitation of the iron sulfates in the final product;
 (b) conducting a first stage of oxidation by reacting the initial reaction solution with dissolved oxygen added to and dissolved in the reaction solution in the presence of sulfuric acid until at least about 90% of the iron in a resulting intermediate product solution is in the form of dissolved ferric sulfate;
 (c) subsequently conducting a second stage of oxidation, following said first stage of oxidation, by reacting the intermediate product solution, from said first stage of oxidation, with hydrogen peroxide in the presence of sulfuric acid until at least about 99% of all iron in a resulting final product solution is in the form of dissolved ferric sulfate; and
 (d) the total amount of sulfuric acid added being such that the final solution contains less than or equal to about 1.5 molar equivalents of sulfate ion per molar equivalent of iron.

8. A process according to claim 7 including the step of:
 (a) providing said initial reaction solution with a catalyst comprising a copper salt selected from the group comprising copper sulfate and copper ammonium sulfate.

9. A process according to claim 8 including the step of:
 (a) providing said catalyst in a concentration of about 220 ppm by weight.

10. A process according to claim 7 including the steps of:
 (a) providing a concentration of dissolved iron, whether in a ferrous or ferric form or combinations thereof, in said initial reaction solution and after said dissolving of at least about 10% by weight; and
 (b) maintaining a concentration of dissolved iron, as either ferric or ferrous ion or combinations thereof, during both of said first stage of oxidation and said second stage of oxidation, of at least about 10% by weight.

11. A process according to claim 7 including the steps of:
 (a) conducting the first stage of oxidation at a temperature of between about 180° F. and about 200° F., while conducting said first stage of oxidation in a pressure vessel and maintaining a pressure of the reaction solution, in the pressure vessel and during the first stage of oxidation, of at least about 100 pounds per square inch; and,
 (b) conducting said second stage of oxidation at atmospheric pressure and a temperature of about 130° F.

12. A process for the preparation of a ferric sulfate solution by the oxidation of ferrous sulfate in the presence of sulfuric acid; said process including the steps of:
 (a) providing an aqueous solution having ferrous sulfate dissolved therein as an initial reaction solution;
 (b) conducting a first stage of oxidation by reacting the aqueous solution of ferrous sulfate with molecular oxygen dissolved in the solution in the presence of sufficient sulfuric acid to generate at least a 90% conversion of all iron in the ferrous oxidation state to iron in the ferric oxidation state; said first stage of oxidation including providing a sufficient amount of sulfuric acid in the aqueous solution to obtain said ferric iron in the form of dissolved ferric sulfate, while simultaneously providing a total amount of molar equivalents of sulfate ion present of less than or equal to about 1.5 molar equivalents per molar equivalent of ferrous ion present prior to said first stage of oxidation; the sulfuric acid being added slowly enough to maintain a relatively low concentration of sulfuric acid in the final product so as to avoid substantial precipitation of iron sulfate;
 (c) conducting a second stage of oxidation, following said first stage of oxidation, by oxidative treatment of a product solution of paragraph b with a non-molecular oxygen oxidizing agent selected from the group comprising: hydrogen peroxide; chlorine dioxide; chlorine; and ammonium persulfate;
 (d) said steps of conducting a first stage of oxidation and a second stage of oxidation including providing a final total amount of molar equivalents of sulfate ion present of equal to about 1.5 molar equivalents per molar equivalent of ferrous ion originally in the initial reaction solution;
 (e) said step of conducting a second stage of oxidation including conducting said second stage of oxidation until at least 99% of the dissolved ferrous sulfate from the initial reaction solution has been converted to dissolved ferric sulfate.

13. A process for the preparation of a ferric sulfate solution by the oxidation of ferrous sulfate in the presence of sulfuric acid; said process including the steps of:
 (a) providing an aqueous solution having ferrous sulfate dissolved therein as an initial reaction solution;
 (b) conducting a first stage of oxidation by reacting the aqueous solution of ferrous sulfate with molecular oxygen dissolved in the aqueous solution in the presence of sufficient sulfuric acid added as needed for converting from ferrous sulfate to ferric sulfate to generate at least a 90% conversion of all iron in the ferrous oxidation state to iron in the ferric oxidation state; said sulfurric acid being added at such a rate to allow reaction of the acid; and iron to limit free sulfuric acid and to avoid substantial precipitation of the iron sulfate in the final product; the total amount of molar equivalents of sulfate ion present at any time during the process being less than or equal to about 1.5 molar equivalents per molar equivalent of ferrous ion present prior to said first stage of oxidation; and
 (c) conducting a second stage of oxidation, following said first stage of oxidation, by addition of ozone to the aqueous solution including ferrous and ferric sulfate with the addition of sulfurric acid being as needed to convert from ferrous sulfate to ferric sulfate; and
 (d) said step of conducting a second stage of oxidation including conducting said second stage of oxidation until at least 99% of the dissolved ferrous sulfate from the initial reaction solution has been converted to dissolved ferric sulfate.

14. A process for the preparation of a ferric sulfate solution by the oxidation of ferrous sulfate in the presence of sulfuric acid; said process including the steps of:
(a) providing an aqueous solution having ferrous sulfate dissolved therein, as an initial reaction solution;
(b) conducting a first stage of oxidation by reacting the aqueous solution of ferrous sulfate with molecular oxygen dissolved in the solution in the presence of sufficient sulfuric acid to generate at least a 90% conversion of all iron in the ferrous oxidation state to iron in the ferric oxidation state in an intermediate solution; said sulfuric acid being added as necessary to convert from ferrous sulfate to ferric sulfate and being added sufficiently slowly to allow reaction so as to prevent substantial precipitation of the iron sulfate in the final product;
(c) conducting a second stage of oxidation, following said first stage of oxidation, by addition of a non-molecular oxygen oxidizing agent selected from the group comprising: hygrogen peroxide; chlorine dioxide; chlorine; and ammonium persulfate to said intermediate solution;
(d) said step of conducting a second stage of oxidation including conducting said second stage of oxidation until at least about 96% of the dissolved ferrous sulfate from the initial reaction solution has been converted to dissolved ferric sulfate; and
(e) the total amount of sulfuric acid added being such that the sulfate ion present in the final product is less than or equal to about 1.5 molar equivalents per molar equivalent of ferrous ion present initially.

15. A process according to claim 14 wherein:
(a) said non-molecular oxygen oxidizing agent is hydrogen peroxide.

* * * * *